United States Patent [19]

Wilson

[11] 4,276,162

[45] Jun. 30, 1981

[54] FLAME RESISTANT SUMP ASSEMBLY

[75] Inventor: Michael Wilson, Modesto, Calif.

[73] Assignee: Racor Industries, Inc., Modesto, Calif.

[21] Appl. No.: 168,694

[22] Filed: Jul. 14, 1980

[51] Int. Cl.³ .............................................. B01D 21/00
[52] U.S. Cl. ..................................... 210/94; 210/175; 210/248; 210/541
[58] Field of Search ................... 210/94, 95, 247, 248, 210/175, 186, 541

[56] References Cited

U.S. PATENT DOCUMENTS

| | | | |
|---|---|---|---|
| 1,616,577 | 2/1927 | Janette | 210/248 |
| 1,762,224 | 6/1930 | Gothmann et al. | 210/94 |
| 1,849,042 | 3/1932 | Pickard et al. | 210/186 |
| 2,646,884 | 7/1953 | Findley | 21/94 |
| 4,021,342 | 3/1977 | Schacht et al. | 210/94 |

Primary Examiner—John Adee
Attorney, Agent, or Firm—Phillips, Moore, Weissenberger, Lempio & Majestic

[57] ABSTRACT

A fuel filter system including a transparent sediment bowl which is protected from thermal shock by means of a flame deflector mounted on and surrounding the lower portion of the sediment bowl. The flame deflector is made of stainless steel and has a wall thickness between ten thousandths and fifteen thousandths of an inch with a stiffening flange about its upper edge. The sediment bowl is preferably made of chemical resistant plastic transparent to visible light providing mechanical shock resistance with the flame deflector providing thermal shock resistance.

10 Claims, 4 Drawing Figures

U.S. Patent      Jun. 30, 1981      4,276,162
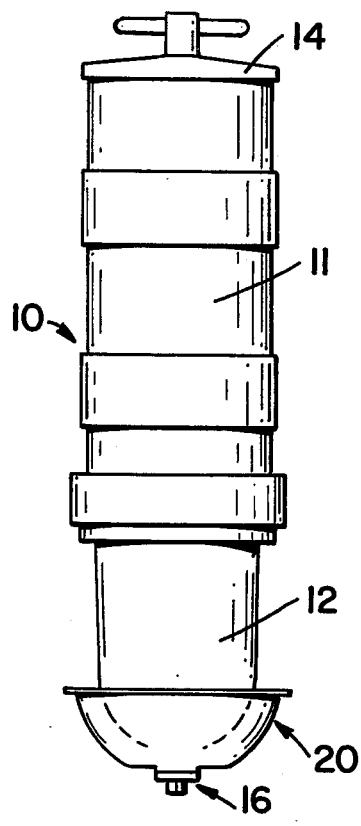
FIG_1
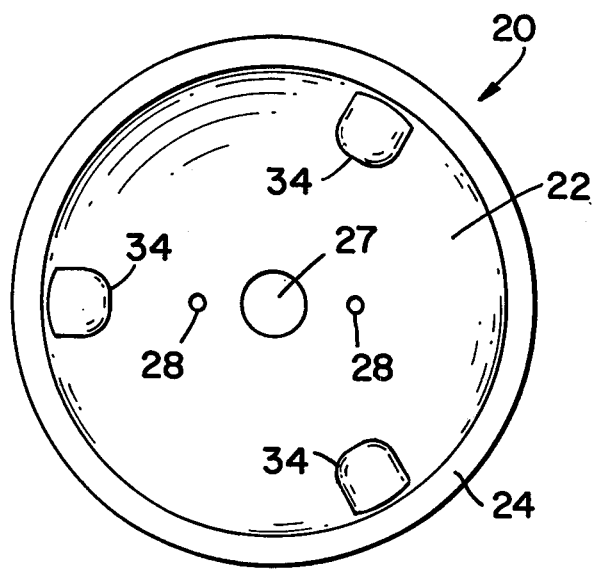
FIG_3
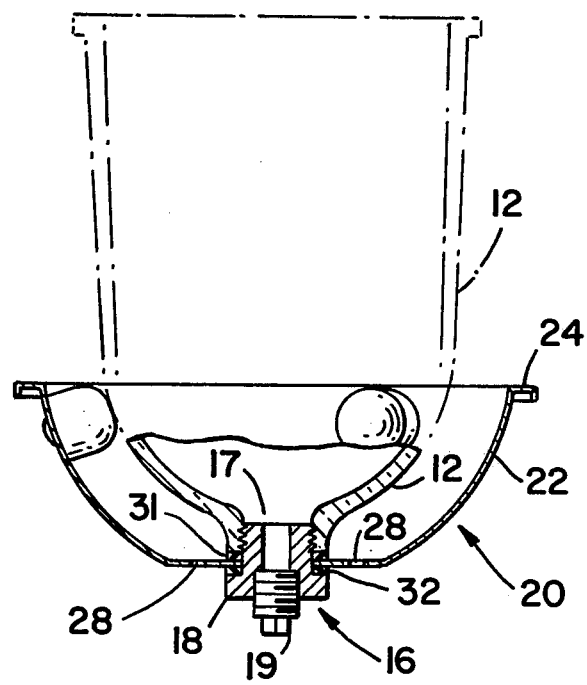
FIG_2
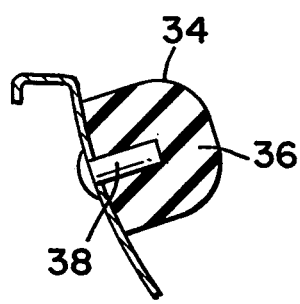
FIG_4

4,276,162

FLAME RESISTANT SUMP ASSEMBLY

DESCRIPTION

1. Technical Field

This invention relates generally to fuel filter systems which include a transparent sediment bowl and more particularly to such a fuel filter system in which a flame deflector is provided to protect the sediment bowl from thermal shock.

2. Background Art

It is conventional to include a sediment bowl in fuel filter systems to aid in the separation of contaminants, such as heavier liquids and particulate matter, from the fuel flow. The sediment bowl is preferably incorporated into a fuel filter structure at the lower end thereof and includes a drain means mounted in an aperture through the bottom of the bowl to enable the removal of contaminants collected therein from the system.

Since fuels are inherently highly flammable, it is necessary that the fuel system including the sediment bowl be capable of withstanding thermal shock without rupturing. This is due to the high risk that fuel will escape from the system and accumulate in the immediate proximity of the system in sufficient quantity to be ignited and subject the system to intense flames.

In the prior art, sediment bowls have been made of ferrous metal, aluminum or bronze, all of which are capable of withstanding thermal shock without rupturing. However, the use of these materials prevents visual monitoring of the accumulation of liquid and solid contaminants in the sediment bowl.

Sediment bowls have also been made of glass in the prior art in order to enable visual monitoring of the accumulation of liquid and solid contaminants therein. Although certain types of glass exhibit good thermal shock resistance, all types of glass exhibit poor mechanical shock resistance.

It is known in the prior art that sediment bowls can be made of transparent chemical resistant plastic in order to provide good mechanical shock resistance. However, plastic sediment bowls exhibit poor thermal shock resistance.

The present invention is directed to overcoming one or more of the problems as set forth above.

DISCLOSURE OF THE INVENTION

In one aspect of the present invention an improved fuel filter system including a chemical resistant plastic sediment bowl, transparent to visible light, is provided. The improvement comprises a flame deflector mounted at the bottom of the sediment bowl and surrounding a lower portion thereof in spaced relation thereto. The flame deflector is made of stainless steel and has a wall thickness between ten thousandths and fifteen thousandths of an inch with a stiffening flange about its upper edge.

BRIEF DESCRIPTION OF THE DRAWING

This invention will be more fully understood from the following detailed description of a preferred embodiment thereof when read in conjunction with the appended drawing wherein:

FIG. 1 is a front view in elevation of a fuel filter including a sediment bowl having a flame deflector mounted at the bottom thereof in accordance with this invention FIG. 2 is an enlarged fragmentary cross-sectional view of the sediment bowl of FIG. 1 with the balance of the sediment bowl indicated in dot-dash lines and with the flame deflector according to a preferred embodiment of this invention shown in cross-section.

FIG. 3 is a top plan view of the flame deflector of this invention according to the embodiment shown in FIG. 2.

FIG. 4 is an enlarged fragmentary cross-sectional view of a portion of the flame deflector of this invention according to the embodiment of FIGS. 2 and 3 showing the spacing means thereof in detail.

BEST MODE FOR CARRYING OUT THE INVENTION

Referring to FIG. 1, a fuel filter 10 of a type known in the art is shown in front elevation with a flame deflector 20 according to this invention mounted thereon. The fuel filter 10 comprises a hollow cylindrical main body portion 11 made of metal and including internal structure for mounting a filter element through which the fuel is passed in order to remove finely divided contaminants entrained in the fuel flow. A sediment bowl 12 closes the lower end of the cylindrical body 11 in use. The upper end of the cylindrical body 11 is closed by a removable cap which provides access to the interior of the body 11 to enable the filter element housed therein to be changed as necessary and desirable.

As will be discussed more fully hereinafter the lower end of the sediment bowl 12 is provided with an aperture which is closed by a drain plug assembly 16. The drain plug assembly 16 provides for the removal of liquid and particulate contaminants which accumulate in the sediment bowl 12 from the fuel which passes through the filter 10 in operation.

The fuel filter 10 includes appropriate inlet and outlet couplings (not shown) for connecting the fuel filter 10 into the fuel flow system. The inlet coupling communicates with the sediment bowl 12 where an initial separation of heavier liquids and large particulate matter takes place. The fuel then flows into the body portion 11 of the fuel filter 10 where it passes through the filtering element. The fully filtered fuel leaves the fuel filter 10 through the outlet coupling for utilization as desired.

Referring to FIG. 2, the lowermost end of the sediment bowl 12 is shown in cross-section with the drain plug assembly 16 mounted in the aperture 17 at the bottom of the sediment bowl 12. The drain plug assembly 16 may conveniently comprise a flanged sleeve 18 threadedly received in the aperture 17 with a drain plug 19 threadedly received in the sleeve 18.

The flame deflector 20 according to the preferred embodiment of this invention shown in FIGS. 2, 3 and 4 comprises a thin metal bowl-like member 22 which surrounds the lower end portion of the sediment bowl 12 in spaced relation to the exterior surface thereof. The upper rim of the bowl member 22 is provided with a stiffening flange 24.

As best shown in FIG. 3, the bowl-like member 22 may be provided with an aperture 27 centrally of the bottom thereof dimensioned to receive the sleeve 18 of the drain plug assembly. In addition, one or more drain holes 28 may be provided through the bottom of the bowl-like member 22 in spaced relation to the aperture 27.

Thus, referring again to FIG. 2, the bowl-like member 22 may be mounted on the bottom of the sediment bowl 12 by means of the drain plug assembly. A pair of gaskets 31 and 32 are preferably placed on opposite sides of the bowl-like member 22 at the periphery of the aperture 27 in order to thermally insulate the bowl-like member 22 from the sediment bowl 12 and the drain plug assembly 16.

According to this invention, the bowl-like member 22 has a wall thickness between ten thousandths of an inch and about fifteen thousandths of an inch. If the wall thickness of the bowl-like member 22 is less than ten thousandths of an inch, it will not have sufficient mechanical strength to enable it to withstand the environment in which it is used without excessive damage. If the wall thickness of the bowl-like member 22 is greater than about fifteen thousandths of an inch, it will provide excessive heat conduction to the drain plug assembly 16 resulting in excessive heating of the sediment bowl 12 when subjected to flames from below.

As best shown in FIGS. 2 and 3, spacing members 34 are interposed between the inner surface of the bowl-like member 22 and the exterior surface of the sediment bowl 12. According to the preferred embodiment of this invention, three such spacing members 34 are provided and spaced 120° from each other about the inner periphery of the bowl-like member 22. Such spacing members 34 are preferably shaped to provide point contact with the exterior surface of the sediment bowl 12 under normal conditions to thereby dampen any vibration of the bowl-like member 22 due to mechanical forces acting thereon in operation.

Referring to FIG. 4, each spacing member 34 may comprise a resilient member made of material having poor heat conducting characteristics such as a block 36 of neoprene rubber, for example. The block 36 may be mounted on the bowl-like member 22 by means of a rivet 38, for example, passing through the wall of the member 22. The spacing members 34 are preferably located adjacent the stiffening flange 24 at the upper periphery of the bowl-like member 22. It would, of course, be possible to use more than three spacing members equally spaced from each other about the inner periphery of the bowl-like member 22. However, such spacing members 34 will provide some conduction of heat from the bowl-like member 22 to the sediment bowl 12 with a greater number of spacing members 34 providing increased heat flow.

As can be seen in FIG. 1, visual monitoring of the accumulation of contaminants in the sediment bowl 12 may be preserved through the use of this invention since the flame deflector 20 does not surround the entire sediment bowl 12. The sediment bowl 12 is preferably made of chemical resistant plastic material in order to provide resistance to mechanical shock.

In ordinary operation, any fuel which escapes from the fuel flow system will tend to accumulate below the sediment bowl. The drain holes 28 will allow any fuel or other liquid which enters the bowl-like member 22 to drain therefrom. Thus, the bowl-like member 22 will be interposed between any accumulated fuel and the sediment bowl 12. If such accumulated fuel should be ignited, the bowl-like member 22 will deflect the resulting flames away from the sediment bowl 12 thus protecting the sediment bowl 12 from thermal shock and excessive heating by such flames for a substantial period of time. Since the bowl-like member 22 is made of thin metal, the conduction of heat from such deflector 22 to the sediment bowl 12 will be minimized with the gaskets 31 and 32 further reducing such heat flow.

The bowl-like member 22 is preferably made of stainless steel in order to provide substantial mechanical strength to resist damage to such bowl-like member 22 in normal use. The stiffening flange 24 and the spacing members 34 cooperate to avoid excessive vibration of the bowl-like member 22 in operation.

It has been found that the use of a flame deflector as disclosed and claimed hereinabove will enable the sediment bowl 12 to withstand flames for more than two and one-half minutes with the temperature of the flames at the flame deflector reaching at least 648° C. at some time during the two and one-half minute period. It will be understood that the accumulation of sufficient fuel beneath the fuel flow system to sustain flames for more than two and one-half minutes will be readily detected enabling appropriate steps to be taken before such accumulated fuel is accidentally ignited.

It will be understood that the bowl-like member 22 may have a cross-sectional configuration different from that shown in the drawing without departing from the teaching of this invention. For example, a "D" shape cross-sectional configuration could be used. Furthermore, if the sediment bowl 12 has a configuration other than a simple bowl shape, then the bowl-like member 22 of the flame deflector 20 may have a corresponding shape. In general, it is desirable that the spacing between the sediment bowl 12 and the bowl-like member 22 of the flame deflector be constant throughout the opposed surfaces thereof.

It is believed that those skilled in the art will make obvious modifications in the structure of the flame deflector according to the preferred embodiment of this invention as shown in the drawing and specifically described hereinabove to suit specific applications thereof and without departing from the scope of the following claims.

What is claimed is:

1. In a fuel filter system including a chemical resistant plastic sediment bowl transparent to visible light at the lower end thereof, said sediment bowl having an aperture in the bottom thereof with a drain means mounted in said aperture, the improvement comprising a flame deflector mounted with said drain means at the bottom of said bowl and surrounding a lower portion of said bowl in spaced relation thereto; said flame deflector being made of stainless steel and having a wall thickness between ten thousandths and fifteen thousandths of an inch with a stiffening flange about the upper edge thereof.

2. The improvement in a fuel filter system as claimed in claim 1 wherein a plurality of resilient spacing members of low heat conductivity are mounted at the inner surface of said flame deflector in compressive contact with the exterior surface of said sediment bowl and in equal spaced relation to each other.

3. The improvement in a fuel filter system as claimed in claim 1 wherein said flame deflector has a mounting aperture in the bottom thereof adapted to receive said drain means therethrough.

4. The improvement in a fuel filter system as claimed in claim 3 wherein said flame deflector is mounted on the bottom of said sediment bowl with said drain means by means including low heat conductivity gaskets interposed between said flame deflector, said drain means and said sediment bowl.

5. The improvement in a fuel filter system as claimed in claim 2 wherein said spacing members comprise three blocks of neoprene rubber mounted on said flame deflector adjacent said stiffening flange and spaced from each other by 120 degrees about the periphery of said sediment bowl.

6. The improvement in a fuel filter system as claimed in claim 1 wherein said flame deflector has an upper portion with a cross-sectional configuration matching the cross-sectional configuration of said lower portion of said sediment bowl, the inner surface of said upper portion of said flame deflector being substantially equally spaced from the opposing exterior surface of said sediment bowl throughout.

7. The improvement in a fuel filter system as claimed in claim 6 wherein said sediment bowl has a cross-sectional configuration defining a spherical lower portion with a cylindrical upper portion.

8. The improvement in a fuel filter system as claimed in claim 7 wherein three resilient spacing members of low heat conductivity are mounted at the inner surface of said flame deflector in contact with the exterior surface of said lower portion of said sediment bowl and spaced from each other by 120 degrees about the periphery of said lower portion of said sediment bowl.

9. The improvement in a fuel filter system as claimed in claim 8 wherein each of said resilient spacing members comprise a block of neoprene rubber.

10. The improvement in a fuel filter system as claimed in claim 9 wherein said aperture in the bottom of said sediment bowl is provided with a cylindrical flange and said flame deflector is mounted at the free end of said cylindrical flange with said drain means by means including a low heat conductivity gasket interposed between said flame deflector and said cylindrical flange.

* * * * *